US007010543B2

United States Patent
Pulst et al.

(10) Patent No.: US 7,010,543 B2
(45) Date of Patent: Mar. 7, 2006

(54) DETERMINING A CHARACTERISTIC FUNCTION FROM A MATRIX ACCORDING TO A SCHEME

(75) Inventors: Uwe Pulst, Nussloch (DE); Armin Löfflad, Augsburg (DE)

(73) Assignee: SAP AG, Walldorf (DE)

( * ) Notice: Subject to any disclaimer, the term of this patent is extended or adjusted under 35 U.S.C. 154(b) by 412 days.

(21) Appl. No.: 10/327,987

(22) Filed: Dec. 26, 2002

(65) Prior Publication Data

US 2003/0212653 A1 Nov. 13, 2003

(30) Foreign Application Priority Data

Dec. 27, 2001 (EP) ................... 01130883

(51) Int. Cl.
  *G06F 17/30* (2006.01)
(52) U.S. Cl. .................................... 707/102
(58) Field of Classification Search .............. 707/1–10, 707/100–104.1, 200–205; 702/183; 700/83; 703/26; 705/76; 717/140
  See application file for complete search history.

(56) References Cited

U.S. PATENT DOCUMENTS

| 5,721,910 A | 2/1998 | Unger et al. ............... 707/100 |
| 2002/0120921 A1 * | 8/2002 | Coburn et al. .............. 717/140 |
| 2003/0182083 A1 * | 9/2003 | Schwenke et al. ........... 702/183 |
| 2003/0182246 A1 * | 9/2003 | Johnson et al. ............... 705/76 |
| 2004/0128120 A1 * | 7/2004 | Coburn et al. ................ 703/26 |

FOREIGN PATENT DOCUMENTS

JP  10-222488  8/1998

OTHER PUBLICATIONS

Bernard Chazelle et al, The side-chain positioning problem: a semidefinite programming formulation with new rounding schemes, 2003, ACM Press, pp. 86-94.*

* cited by examiner

*Primary Examiner*—Diane Mizrahi
(74) *Attorney, Agent, or Firm*—Finnegan, Henderson, Farabow, Garrett & Dunner, L.L.P.

(57) ABSTRACT

Computer-supported methods and systems are disclosed for determining a characteristic function from a matrix that contains a defined number of data records having classifiable features. The matrix may be processed and then the characteristic function may be calculated by taking into account the processed matrix. Processing of the matrix may include one or more processing steps, such as enrichment of the matrix with classes for the features and/or compression according to the classes. Further, such methods and systems may be controlled by the interpretation of a predetermined scheme. The predetermined scheme may define the sequence of individual executions for the processing the matrix (including enrichment and compression) and the rules for the particular individual executions.

43 Claims, 22 Drawing Sheets

ENRICHMENT 431 GLOBAL

FIG. 4

| DS(1) | E(1,1) | E(1,2) | ... | E(1,n$_0$) | ... | E(1,N$_0$) |
|---|---|---|---|---|---|---|
| DS(z$_0$) | E(z$_0$,1) | E(z$_0$,2) | ... | E(z$_0$,n$_0$) | ... | E(z$_0$,N$_0$) |
| DS(Z$_0$) | E(Z$_0$,1) | | ... | | ... | E(Z$_0$,N$_0$) |

MATRIX       X$_0$

DATA RECORD  DS → M

ELEMENT      E  → K

FIG. 9

| DS(1) | E(1,1) | ... | B | E(1,N) | 10xxx |
|---|---|---|---|---|---|
| | | ... | HD | | 69xxx |
| DS(z) | E(z,1) | ... | MA | E(z,N) | 68xxx |
| | | ... | F | | 60xxx |
| DS(Z) | E(Z,1) | ... | D | E(Z,N) | 50xxx |

MATRIX X  ENRICHED MATRIX X'  SECONDARY MATRIX X°

ENRICHMENT 431 LOCAL

FIG. 10

|  | M |  |  |  | K |
|---|---|---|---|---|---|
| DS(1) | E(1,1) | 3 | ⋮ | E(1,N) | 4.0 |
|  | ⋮ | 4 | ⋮ | ⋮ | 4.0 |
| DS(z) | E(z,1) | 3 | ⋮ | E(z,N) | 4.0 |
|  | ⋮ | 5 | ⋮ | ⋮ | 4.0 |
| DS(Z) | E(Z,1) | 5 | ⋮ | E(Z,N) | 4.0 |

MATRIX X

ENRICHED MATRIX X'

SECONDARY MATRIX X°

ENRICHMENT 431 GLOBAL

FIG. 11

MATRIX $X_0$:

| | E(1,1) | E(1,2) | ... | E(1,$n_0$) | ... | E(1,$N_0$) |
|---|---|---|---|---|---|---|
| DS(1) | | | | | | |
| | ... | ... | ... | ... | ... | ... |
| DS($z_0$) | E($z_0$,1) | E($z_0$,2) | ... | E($z_0$,$n_0$) | ... | E($z_0$,$N_0$) |
| DS($\mu_0$) | E($\mu_0$,1) | E($\mu_0$,2) | ... | E($\mu_0$,$n_0$) | ... | E($\mu_0$,$N_0$) |
| | ... | ... | ... | ... | ... | ... |
| DS($Z_0$) | E($Z_0$,1) | E($Z_0$,2) | ... | E($Z_0$,$n_0$) | ... | E($Z_0$,$N_0$) |

↓ 432

MATRIX $X_1$:

| | E(1,1) | E(1,2) | ... | E(1,$n_1$) | ... | E(1,$N_1$) |
|---|---|---|---|---|---|---|
| DS(1) | | | | | | |
| | ... | ... | ... | ... | ... | ... |
| DS($z_1$) | E($z_1$,1) | E($z_1$,2) | ... | E($z_1$,$n_1$) | ... | E($z_1$,$N_1$) |
| DS($Z_1$) | E($Z_1$,1) | E($Z_1$,2) | ... | E($Z_1$,$n_1$) | ... | E($Z_1$,$N_1$) |

COMPRESSING 432      $Z_0 > Z_1$

FIG. 12

1. READING

| DS($z_0$) | ... | E($z_0$,R) | ... | E($z_0$,S) |
| DS($\mu_0$) | ... | E($\mu_0$,R) | ... | E($\mu_0$,S) |

2. QUESTION: Do E($z_0$,R) and E($\mu_0$,R) meet the condition?

YES:                              NO

3. ACTION:  • E($z_1$,R)                  • DS($z_0$), DS($\mu_0$) unchanged

• E($z_1$,S) = E($z_0$,S) $\oplus$ E($\mu_0$,S)

| DS($z_1$) | ... | E($z_1$,R) | ... | E($z_0$,S) $\oplus$ E($\mu_0$,S) |

COMPRESSING 432, RULE

FIG. 14

| | 210 h | 220 L/G | 230 TYP | 240 RULE | 250 PARAMETER | |
|---|---|---|---|---|---|---|
| 1 | 0 | | INPUT | | $X_0$ | |
| 2 | 0 | G | ENRICHMENT | NUMBER - AVERAGE | M: COLUMN 2 K: X° | (see, e.g., FIG. 10) |
| 3 | | L | ENRICHMENT | COMMUNITY - ZIP | ALL DATA RECORDS DS M: COLUMN 3 K: X° | (see, e.g., FIG. 9) |
| 4 | 0 | | COMPRESSION | MW - BL | R, S | (see, e.g., FIG. 12) |
| 5 | 1 | | | | | |
| 6 | 2 | | | | | |
| 7 | 2 | | COMPRESSION | | | |
| 8 | 3 | | | | | |
| 9 | 3 | | READ OUT | | Y | |

SCHEME 200

FIG. 20

| FEATURE M | | CLASS K | |
|---|---|---|---|
| INSTANCE 301 | GROUP 302 | INSTANCE 303 | GROUP 304 |
| 3; 4; 5 | Natural numbers | 4.0 | Average |
| Mannheim | Community | 10xxx | ZIP |
| Heidelberg | Community | 69xxx | ZIP |
| Mannheim | Community | Baden-Württemberg | Fed. state |
| Heidelberg | Community | Baden-Württemberg | Fed. state |
| HD; S; KA; FB | District | Southwest | Region |
| 69001 ... 69999 | ZIP Code | 6 | ZIP-Region |
| SAP AG | Company | AG | Legal form |
| Screws | Product | Metal | Branch |
| Sunshades; Umbrellas | Product | Textile | Branch |
| Sunshades; Umbrellas | Product | Nice weather Bad weather | Weather |

FIG. 21

| 302 | 304 | L/G |
|---|---|---|
| Number | Average | G |
| Community | ZIP Code | L |
| Community | Federal State | L |
| District | Region | L |
| District | Federal State | L |
| Community | District | L |
| Company | Legal form | L |
| Product | Branch | L |
| Product | Weather | L |
| Number | Total | G, L |

RULES 300

DETERMINING A CHARACTERISTIC FUNCTION FROM A MATRIX ACCORDING TO A SCHEME

FIELD OF THE INVENTION

The present invention generally relates to the technical processing of data with a computer system, a data processing method and a data processing program. In particular, the invention relates to a method, a program and a system for determining a characteristic function from a given matrix.

BACKGROUND INFORMATION

Data is the basis for making decisions in all areas of the economy. Only in very few cases do the decision makers evaluate the data directly; in most cases, the data must first be processed according to certain specifications. In the area of finance, for example, credit data is used to appraise risks. The corresponding specifications are standardized to some extent. The discussion around the "Basel [Capital] Accord/Basel II," a planned revision of the international guidelines for appropriate capital endowment of credit institutions, shall be mentioned here as representative. In addition, the Federal Authority for the Supervision of Banks (BAKred) has jurisdiction over these affairs in the Federal Republic of Germany.

The data to be processed is considered below as matrices (working tables) having rows and columns, where one row corresponds to one data record (DS). The computer system implements the matrices in a known manner. The processing method and processing program control the computer system to calculate a characteristic function according to the specifications. The calculated characteristic function shows the dependence of a first variable on a second variable. In the simplified case, the characteristic function is reduced to individual characteristic values. To continue with the finance example, the characteristic function may describe the loss (on the order of billions of euros, €) to be expected from credit portfolio transactions in the extreme case. More precisely, the characteristic function may indicate the probability (e.g., 99%) that this loss will not be exceeded. The calculations are usually based on one year.

Technical restrictions are determined by resources, computation time and accuracy. In other words, available computer systems must calculate the characteristic function with sufficient accuracy within a specified period of time (requirements).

Additional restrictions are based on the division of labor between the software manufacturer (e.g., SAP AG, Walldorf, Germany) and the user (e.g., a financial institution). First, the manufacturer must take into account public requirements (cf. Basel). Second, the manufacturer must not disclose application-specific specifications to the user's competitors. In other words, the user retains his data processing model (e.g., portfolio model) as a trade secret. The processing programs must therefore have technical interfaces with which the user can program functions without having to rely on the manufacturer ("customizing," "user exits").

In order to meet these and other requirements, the following technical objects are derived, namely: shortening the computation time while achieving sufficient accuracy (TIME); reducing the size of system resources (memory and bandwidth) necessary for the calculation (RESOURCES); establishing the sequence of processing steps (SEQUENCE); testing the accuracy of the processing steps before and after their execution (TESTING); taking into account changes in the original matrix, which occur during the calculation (CHANGES); and setting up interfaces for defining and specifying processing steps (INTERFACES).

SUMMARY OF THE INVENTION

Methods, systems and computer programs according to embodiments of the invention meet the requirements stipulated above. Preferred embodiments of the invention are also disclosed herein and within the scope of the claims.

Embodiments of the present invention relate to, for example, a method of data processing with a program-controlled processor for determining a characteristic function from a matrix with a specified number of data records having classifiable features. Such a method may include: processing the matrix and calculating the characteristic function, taking into account the majority of data records of the matrix thus processed, whereby the processing is performed by enriching the matrix with classes for the features while retaining the number of data records and compressing according to the classes, reducing the number of data records. Additionally, the method may include interpretating a predetermined scheme in which the sequence of the individual executions of enrichment and compression as well as the rules for the individual executions are defined.

Embodiments of the invention may include one or more of the following features:

calculating the characteristic function in the processing mode of enrichment;

calculating the characteristic function with the help of another matrix that is linked to the matrix processed;

deriving the classes according to predetermined rules from the features in enrichment;

supplementation by using predetermined standard values according to the rules;

applying the rules to one data record in each case, so that the feature and class remain in this one data record;

overwriting the feature by the class;

applying the rules to at least one first data record and one second data record, whereby features from the two data records determine one class;

transferring the class into at least one of the two data records;

selecting a dominant class in the case of different features, where the class corresponds to one of the two features or is at a higher level;

applying the rules to all data records in each case, so that features from all data records determine one class;

applying one rule for the combination of a feature group with a class group, in the case of enrichment;

applying a chain rule;

executing individual executions of the process step of processing in the processing mode of enrichment such that elements of a data record remain within the same data record;

repeating the process step of processing;

executing the process step of calculating the characteristic function with the matrix processed the last time by compression;

processing in the processing mode of compression up to a predetermined number of executions;

executing the process step of processing in a combination of the processing modes of enrichment and compression;

enriching before compression such that features are received unchanged as classes;

applying the rules to compression as well as enrichment;

taking into account correlating instances of features and classes in enrichment and compression;

processing and calculation performed on matrices implemented in the main memory;

the modifiability of the predetermined scheme independently of an interpreter;

controlling the processor through sequential processing of the scheme;

specifying individual steps of the scheme in subschemes;

specializing the subschemes for enrichment and compression;

checking for sequences of processing steps of the enrichment type before processing the scheme, enrichment being performed within the data records in the case of the sequences, so that the processing steps are executed in parallel;

using an interface, the data records being read by the interface, processed by an expansion program and written back to the matrix by the interface for execution of the process step of processing;

using an interface which is defined in XML;

characterizing a data record after the step of processing this data record has been performed;

storing interim results;

taking into account all the data records in the calculation step;

compressing data records from a first matrix and from a second matrix;

testing for the identity of matrix elements after processing; and/or using the features and classes as numbers, text, keywords, database pointers, main memory pointers or tables.

In one embodiment of the invention, the data processing method is executed by a computer that manages both the control program and the matrices in the main memory. The preferred use of such a method is in the financial area, where such a scheme, which describes the characteristic function as a probability of a financial loss with a specified order of magnitude, is used.

Embodiments of the present invention also relate to a computer system for executing the method; a program medium with a computer-readable medium on which computer-readable program code means are stored, these means being used to execute the method according to each of the claims, as well as a computer program product with program instructions that cause a processor to execute the process steps.

The computer program product has instructions for a processor, the computer program product for determining a characteristic function from a matrix with a predetermined number of data records with classifiable features, the computer program product with instructions for processing the matrix and calculating the characteristic function, taking into account most of the data records of the matrix processed, where the processing takes place through enrichment of the matrix with classes for the features, retaining the number of data records, and with instructions for compression according to classes, reducing the number of data records. The computer program product is characterized by instructions for interpreting a predetermined scheme by defining the sequence of the individual executions of enrichment and compression and the rules for the respective individual executions.

BRIEF DESCRIPTION OF THE DRAWINGS

FIG. 4 shows an exemplary input matrix as a matrix of the zero order;

FIG. 9 shows an example of enrichment in the LOCAL instance in a detailed diagram;

FIG. 10 shows an example of enrichment in the GLOBAL instance in a detailed diagram;

FIG. 11 shows an example of compression in a simplified diagram;

FIG. 12 shows details for an exemplary rule for compression;

FIG. 14 shows an exemplary processing scheme on the basis of an example;

FIG. 20 shows an exemplary table with features and classes, each in instance and group;

FIG. 21 shows an exemplary table for rules; and

DETAILED DESCRIPTION

Figure 3:
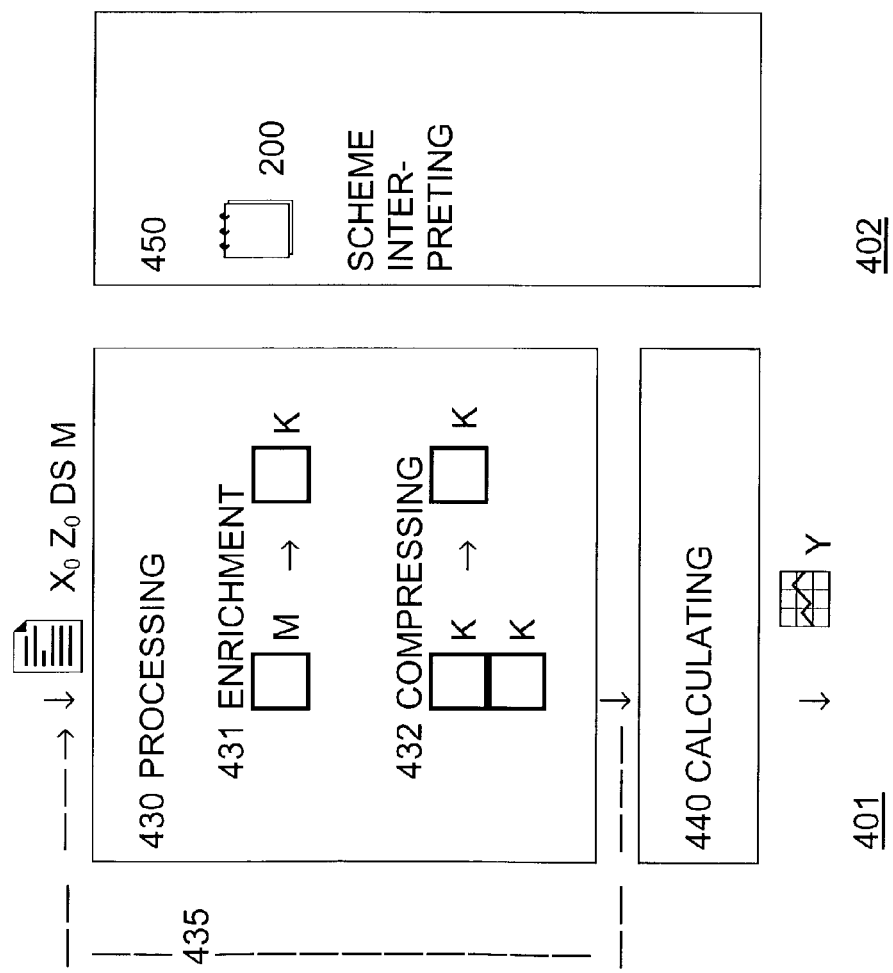
FIG. 3 shows a simplified flow chart for determining the characteristic function according to an exemplary method of the invention with enrichment and compression.

After presenting an exemplary computer system (FIG. 1) in which this invention can be implemented, means of achieving the aforementioned objects will be presented first (FIG. 3). The drawings are presented individually (FIGS. 4–22). Additional aspects will be discussed. In conclusion, the integrative means of achieving all objects will be presented on the example of a financial application.

According to embodiments of the invention, in determining the characteristic function from a matrix, the TIME and RESOURCES objects may be achieved by executing the processing as enrichment and compression and for the one-time calculation of the function, taking into account most data records of the compressed matrix. Enrichment may be performed locally or globally.

According to embodiments of the invention, the SEQUENCE object may be achieved by defining a scheme.

According to embodiments of the invention, the TESTING object may be achieved by evaluating the scheme before the calculation. Predetermined criteria are applied to the scheme (e.g., consistency testing). Comparison of matrix elements before and after processing is also provided.

According to embodiments of the invention, the CHANGING function may be solved by the characterization of the processing steps executed in the respective data records.

According to embodiments of the invention, INTERFACES that can be managed in the scheme are provided. On the basis of the definition of the calculations in the scheme itself, it is possible to create individual calculation routines independently of one another.

In the following description, English terms, synonyms and examples of content are marked by using quotation marks " ". Elements not considered in greater detail in the drawings are represented by ellipsis ". . . ". The reference notation used are listed before the claims.

Figure 1:
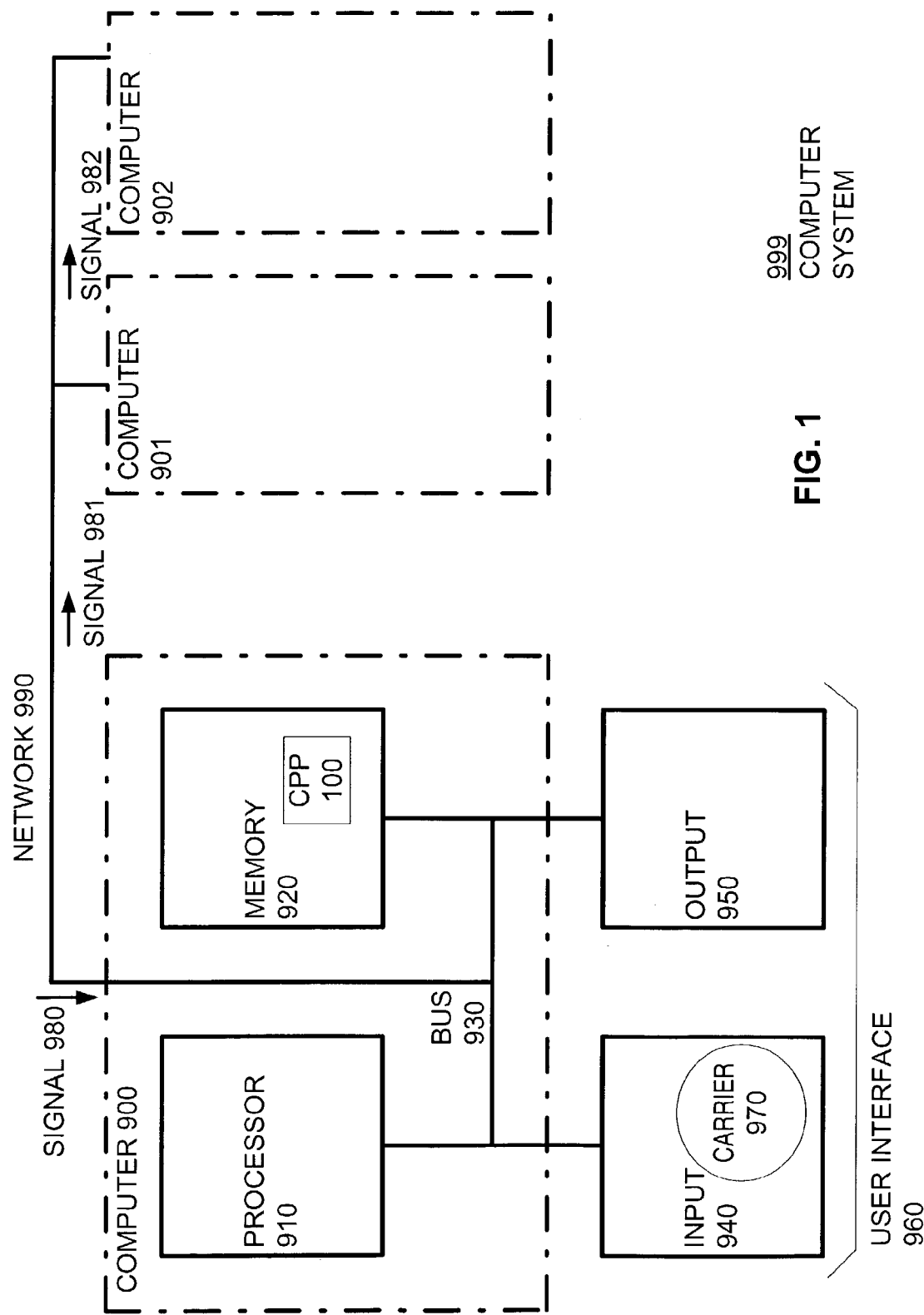
FIG. 1 shows a simplified block diagram of an exemplary computer system.

FIG. 1 shows a simplified block diagram of an exemplary computer network system 999 comprising a plurality of computers (or 90$q$, q=0–Q–1, Q being any number). The computers 900–902 are connected via a network 990 ("network"). Computer 900 includes a processor 910 ("processor"), a memory 920 ("memory"), a bus 930 and optionally an input device 940 ("input") and an output device 950 ("output"). The input and output devices yield a user interface 960 ("user interface"). Embodiments of the invention may be implemented by way of a computer program product (CPP) 100 (or 10$q$, where q=0–Q–1, Q being any number), a program medium 970 and/or a program signal 980. These components are referred to below as a program.

Elements 100 and 910–980 of computer 900 are generalizations of the corresponding elements 10$q$ and 91$q$–98$q$ (shown for q=0 in computer 90$q$).

Computer 900 is, for example, a conventional personal computer (PC), a multiprocessor computer, a mainframe computer, a portable or stationary PC or the like.

Processor 910 is, for example, a central processor (CPU), a microcontroller (MCU), or a digital signal processor (DSP).

Memory 920 symbolizes elements that store data and commands either temporarily or permanently. Although memory 920 is shown as a part of computer 900 to facilitate an understanding, the memory function may also be implemented elsewhere in network 990, e.g., in computers 901/902 or in processor 910 itself (e.g., cache, register). Memory 920 may be a read-only memory (ROM), a random-access memory (RAM) or a memory having other access options. Memory 920 is implemented physically on a computer-readable program medium, e.g., on: (a) a magnetic medium (hard drive, diskette, magnetic tape); (b) an optical medium (CD-ROM, DVD); (c) a semiconductor medium (DRAM, SRAM, EPROM, EEPROM); or (d) any other medium (e.g., paper).

Memory 920 is optionally distributed over various media. Parts of memory 920 may be installed fixedly or exchangeably. For reading and writing, computer 900 uses known means such as disk drives or tape drives.

Memory 920 stores supporting components such as a BIOS (basic input output system), an operating system (OS), a program library, a compiler, an interpreter or a text processing program. Supporting components are available commercially and can be installed on computer 900 by authorized personnel. To facilitate an understanding, these components are not shown here.

CPP 100 includes program instructions and optionally data that prompt processor 910 to execute process steps 430–450 of the present invention. These process steps are explained in detail later. In other words, computer program 100 defines the function of computer 900 and its interaction with network system 999. Although this is not intended to be restrictive, CPP 100 may be, for example, in the form of a source code in any program language or as binary code in a compiled form. Those skilled in the art are capable of using CPP 100 in combination with any of the supporting components mentioned above (e.g., compiler, interpreter, operating system).

Although CPP 100 is shown as stored in memory 920, CPP 100 may also be stored at any other location. CPP 100 may also be stored on program medium 970.

Program medium 970 is illustrated as being outside of computer 900. To transfer CPP 100 to computer 900, medium 970 may be inserted into input device 940. Medium 970 is implemented as any computer-readable medium, e.g., as one of the media explained above (cf. memory 920). In general, medium 970 is a product containing a computer-readable medium on which computer-readable program code means are stored, which may be used for execution of methods according to embodiments of the present invention. In addition, program signal 980 may also contain CPP 100. Signal 980 is transmitted over network 990 to computer 900.

The detailed description of CPP 100, medium 970 and signal 980 is also applicable to program media 971/972 (not shown), program signal 981/982 as well as the computer program product (CPP) 101/102 (not shown), which is executed by processor 911/912 (not shown) in computer 901/902.

Input device 940 stands for a device that supplies data and instructions for processing by computer 900. For example, input device 940 may be a keyboard, a pointing device (mouse, trackball, cursor arrows), microphone, joystick, scanner. Although all these examples involve devices with human interaction, device 940 may also function without human interaction, such as a wireless receiver (e.g., via satellite antenna or terrestrial antenna), a sensor (e.g., a thermometer), a counter (e.g., a piece/parts counter in a factory). Input device 940 may optionally also be used for reading the medium 970.

Output device 950 stands for a device that displays instructions and data that have already been processed. Examples include a monitor or another display (cathode ray tube, flat screen display, liquid crystal display, loudspeaker, printer, vibration alarm. As is the case with input device 940, output device 950 communicates with the user, but it may also communicate with other computers.

Input device 940 and output device 950 may be combined in a single device. Further, devices 940 and/or 950 may be provided as optional.

Bus 930 and network 990 represent logic connections and physical connections that transmit both commands and data signals. Connections within computer 900 are usually referred to as bus 930, while connections between computers 900 and 902 are referred to as network 990. Devices 940 and 950 are connected to computer 900 by bus 930 (as shown) or are optionally connected by network 990. The signals within computer 900 are primarily electric signals, whereas the signals in the network may be electric, magnetic and optical signals or may also be wireless radio signals.

Network environments (such as network 990) are conventional in offices, corporate-wide computer networks, intranets and in the Internet (i.e., World Wide Web). The physical distance between computers in the network is irrelevant. Network 990 may be a wireless network or a hardwired network. Possible examples of implementation of network 990 that may be listed here: a local area network (LAN), a wide area network (WAN), an ISDN network, an infrared (IR) connection, a wireless connection such as the Universal Mobile Telecommunication System (UMTS) or a satellite connection.

Transmission protocols and data formats are known. Examples include TCP/IP (transmission control protocol/Internet protocol), HTTP (hypertext transfer protocol), URL (unique resource locator), HTML (hypertext markup language), XML (extensible markup language), WML (wireless application markup language), etc.

Interfaces for connecting the individual components are also known. For simplification, the interfaces are not shown. An interface may be, for example, a serial interface, a parallel interface, a gameport, a universal serial bus (USB), an internal or external modem, a graphic adaptor or a sound card.

Computers and programs are closely related. In the descriptions, terms such as "the computer makes available" and "the program makes available" are conventional shorthand for describing the program-controlled process steps of the computer.

Figure 2:
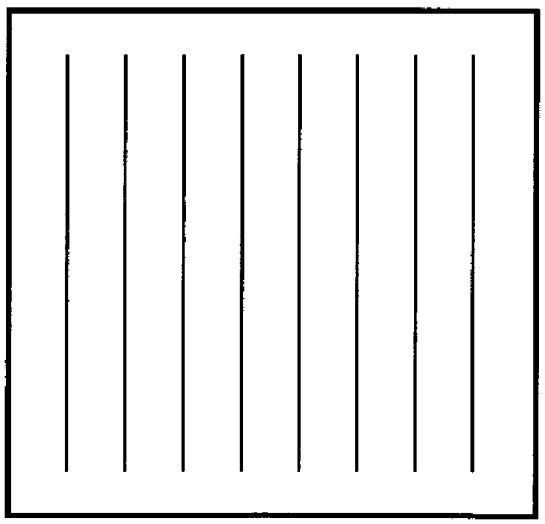
FIG. 2 shows the determination of a characteristic function from an input matrix according to the prior art.

FIG. 2 shows the determination of a characteristic function Y from an input matrix X according to the prior art. One specification is applied to all data records (rows). The required resources are often insufficient, and the processing time is undesirably long. This is a disadvantage especially when computing complexity increases in a nonlinear ratio to the number of data records (e.g., quadratically or exponentially).

FIG. 3 shows a simplified flow chart for determining the characteristic function, according to an exemplary method of the present invention.

In the embodiment of FIG. 3, processing (enriching and compressing) and calculating are illustrated according to the main points of emphasis by a first method 401. Further, use of the scheme is illustrated according to the main point of emphasis by a second method 402. Some process steps are used in both processes. The term "class" is used as a synonym for "classifier" and category.

A first method 401 for data processing with a program-controlled processor 100/910 (see FIG. 1) concerns the determination of a characteristic function Y from a matrix $X_0$ using a predetermined number $Z_0$ of data records DS having classifiable features M. Method 401 is characterized by the execution of a process step, i.e., processing 430, in the two processing modes of (a) enrichment 431 of the matrix with classes K for the features M, the number of data records DS being preserved, and (b) compressing 432 according to classes K with a reduction in the number of data records DS; and by the execution of a process step, i.e., calculation 440 of the characteristic function Y, taking into account most of the data records of the processed matrix.

Processing 430 (enriching 431/compressing 432) and calculating 440 contribute to solving the aforementioned technical problems of TIME and RESOURCES. Resources are utilized optimally. The characteristic function Y can be calculated despite a "large" matrix $X_0$ (e.g., $Z_0$ in the million range). The matrix compressed last (i.e., the intermediate matrix) contains fewer data records than the original matrix $X_0$. Details and additional advantages are explained below.

A second method 402 of data processing using a program-controlled processor 100/910 relates to the determination of characteristic function Y from the matrix $X_0$ with a predetermined number $Z_0$ of data records DS having classifiable features M, and it includes processing 430 of the matrix and calculation 440 of the characteristic function Y, taking into account most of the data records of the matrix processed. Processing 430 is performed by enriching 431 the matrix with classes K for the features M (retaining the number of data records DS), and compressing 432 according to classes K (with a reduction in the number of data records DS). Method 402 is characterized by interpretation 450 of a predetermined scheme 200, which defines the sequence of the individual executions of enrichment 431 and compression 432 as well as the rules for the particular individual executions. Interpreting 450 can also be applied to calculation 440.

Figure 15:
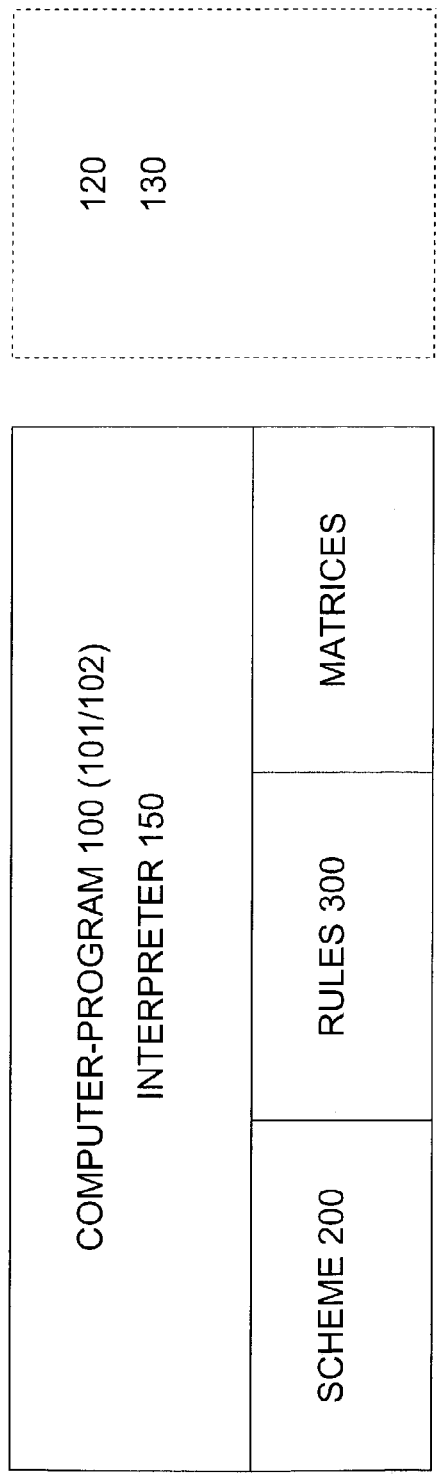
FIG. 15 shows an exemplary computer program with an interpreter, the scheme, rules and matrices.
Figure 16:
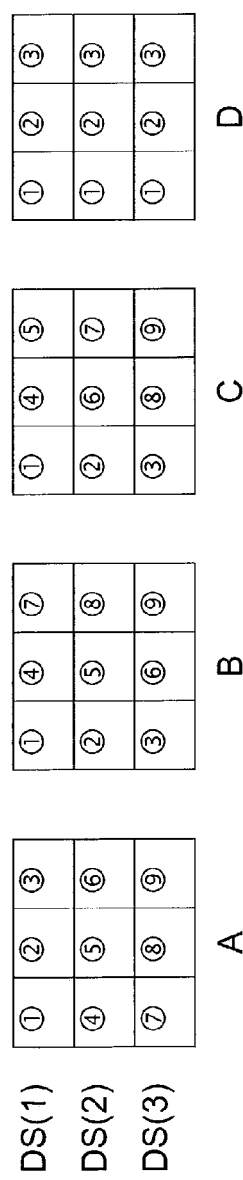
FIG. 16 shows an exemplary definition of the sequence of steps.

In addition to the blocks for the process steps of processing 430, calculating 440 and interpreting 450 (only 402), FIG. 3 also uses symbolic representations: matrix $X_0$ (e.g., FIG. 4); characteristic function Y (e.g., FIG. 5); repeating 435 the steps (e.g., FIG. 6 with the illustration of multiple matrices); enriching 431 (e.g., FIGS. 7–10); compressing 432 (e.g., FIGS. 11–13); as well as the scheme 200 (e.g., FIGS. 14–16).

Figure 22:
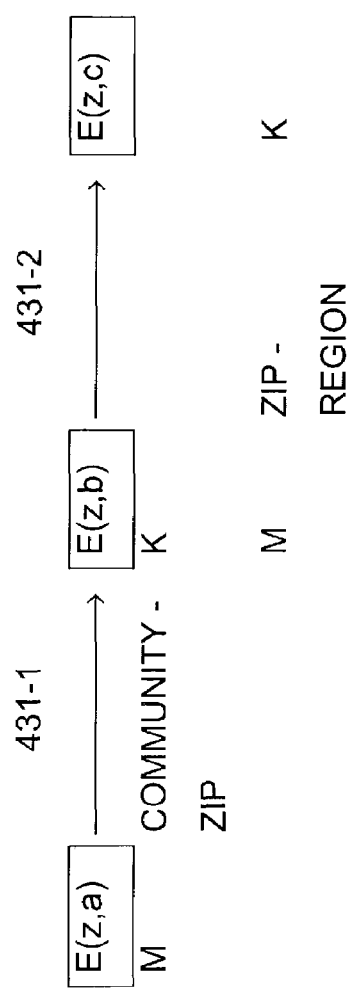
FIG. 22 shows an example of enrichment in several steps using a chain rule.

There follow some embodiments and examples of applications, which also contribute to a solution of other problems, as an expansion program/interface (e.g., FIGS. 17–18); testing (e.g., FIG. 19), features M, classes K and rules (e.g., FIGS. 20–22).

FIG. 4 shows an example of a matrix $X_0$ of the zero order (index 0, "input matrix"). Data records DS are indicated with the row index $z_0$ in parentheses; the number of data records (rows) is $Z_0$. The data records are represented as DS(1), DS($z_0$), DS ($Z_0$).

Each data record DS has up to $N_0$ elements E ($z_0, n_0$), which are identified with the row index $z_0$ and the column index $n_0$ in parentheses. Elements E have the function of features M and classes K derived therefrom (cf. FIG. 2, M and K). One element may fulfill both functions at the same time. It is also possible for one element to appear first as feature M and then as class K. Optionally any element may be executed as submatrices or as pointers in tables, memory areas and the like.

The order ("level") zero stands first for the presence of all data records that are initially available to the computer (e.g., from a database table).

Figure 5:
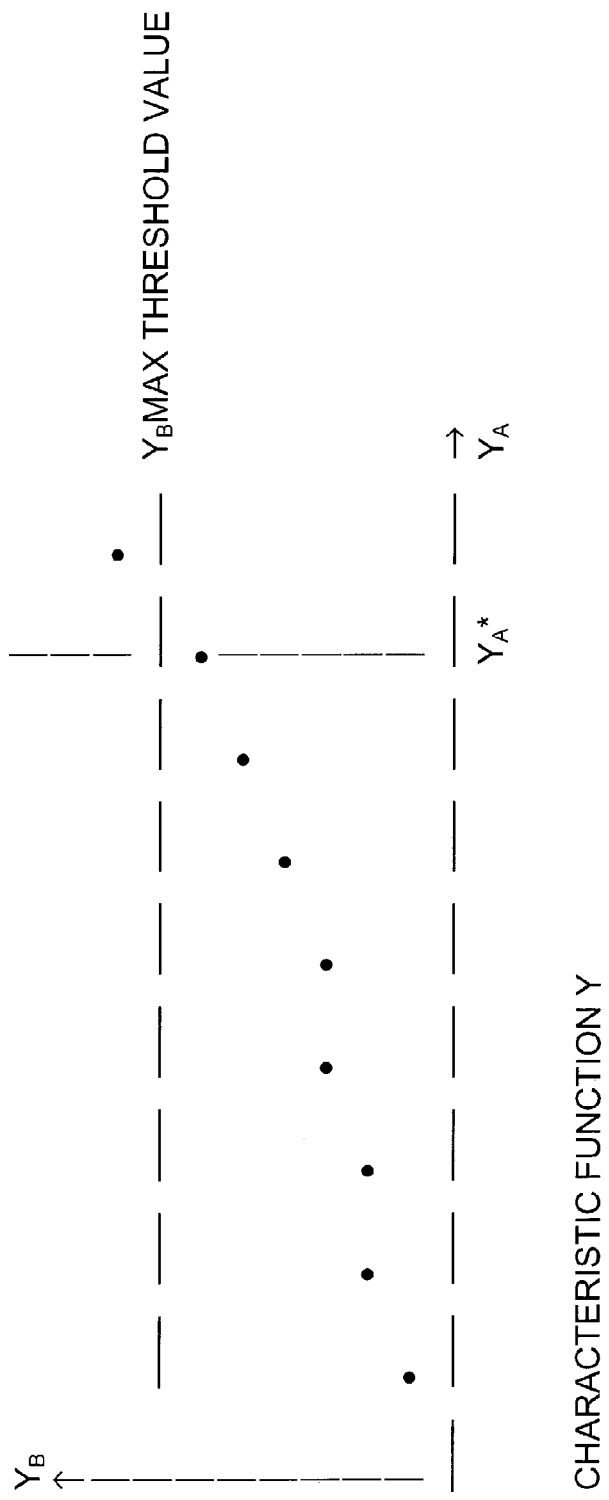
FIG. 5 shows an exemplary characteristic function and a threshold value.

FIG. 5 shows as an example of a characteristic function Y with value pairs of the quantities $Y_A$ (abscissa) and $Y_B$ (ordinate) as well as the threshold value $Y_B$MAX (broken line). It is advantageous to display the calculated characteristic function Y (e.g., display screen, Excel table, printout, report). The observer can make a business decision. For example, $Y_A^*$, the abscissa of the threshold value, is an important characteristic value.

When embodiments of the invention are used in finance, for example, $Y_B$ (ordinate) stands for a probability ($Y_B$MAX=99%), and $Y_A$ (abscissa) stands for a loss that has a certain probability of not occurring ($Y_A^*$ is a numerical value on the order of a million €).

The characteristic function may be reduced to a few characteristic numbers (e.g., $Y_A^*$)

Figure 6:
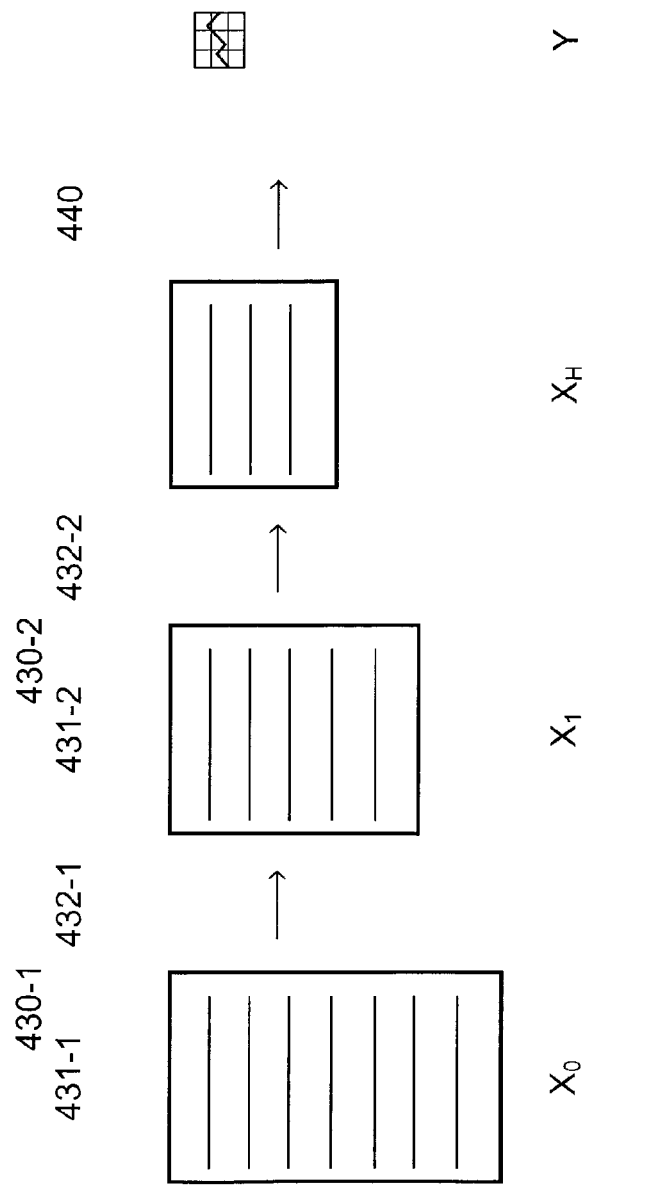
FIG. 6 shows an exemplary calculation of a characteristic function from an input matrix via intermediate matrices.

FIG. 6 shows the determination of the characteristic function Y from matrix $X_0$ (zero order, see FIG. 4) by way of intermediate matrices of a higher order. The orders of the intermediate matrices are characterized in general with index h. Index H stands for the highest order.

The steps of processing 430 and calculating 440 (see FIG. 3) are represented by arrows. It is true in general that a matrix $X_h$ (h=0 . . . H−1) is processed 430 in an intermediate matrix $X_{h+1}$; the intermediate matrix of the highest order $X_H$ is used for calculating 440 the characteristic function Y.

Processing 430 of matrices $X_1$ through $X_H$ takes place in the processing modes of enrichment 431 and compression 432. Calculation 440 may take place with the assistance of another matrix, so that intermediate matrix $X_H$ is linked by matrix operations to the additional matrix.

The order of the matrix is increased by compression 432. In other words, the ordinal number h denotes the number of steps of compression 432 performed. Matrix $X_0$ of the order zero is uncompressed, matrix $X_1$ of the first order has been compressed once, etc.

$X_0$ of the zero order is enriched 431-1 and then compressed 432-1 to the intermediate matrix $X_1$ of the first order (processing 430-1). Intermediate matrix $X_1$ of the first order is enriched 431-2 and then compressed 432-2 to yield an intermediate matrix $X_2$ of the second order (processing 430-2). The intermediate matrix $X_H$ (H=2) is used for calculating 440 the characteristic function. The control is accomplished with the help of scheme 200 (see, e.g., FIGS. 3 and 14).

Enriching 431 and compressing 432 may be performed simultaneously; however, the steps will be considered individually to simplify the description. To simplify the discussion, the description uses the terms processing 430, enriching 431 and compressing 432 not only with regard to complete matrices (such as $X_1$, $X_2$, etc.) but also with regard to individual data records (such as DS(z), DS($\mu$), etc.).

Figure 7:
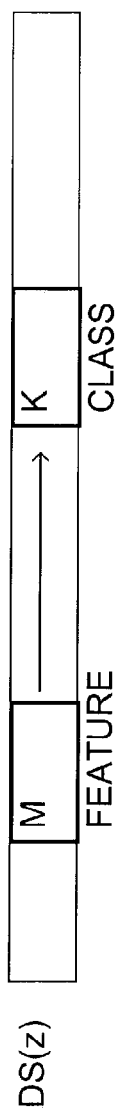
FIG. 7 shows an example of enrichment in the LOCAL instance in a simplified diagram.
Figure 8:
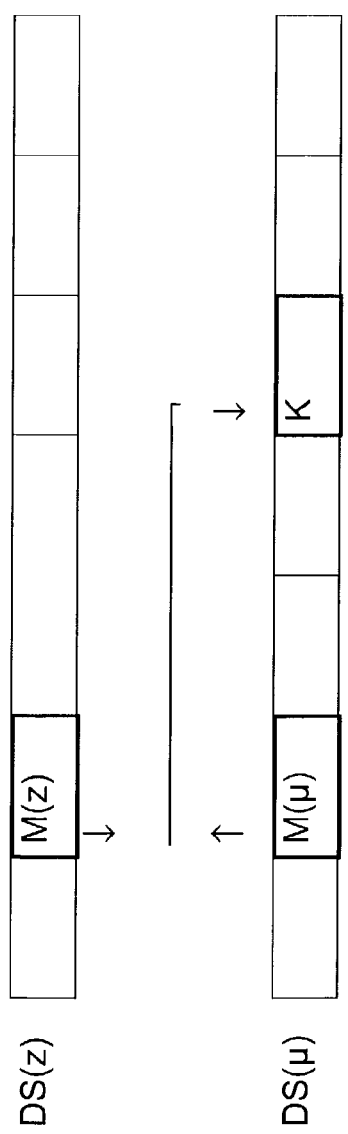
FIG. 8 shows an example of enrichment in the GLOBAL instance in a simplified diagram.

FIGS. 7–8 show, in simplified diagrams, examples of LOCAL and GLOBAL instances of the enrichment step 431. At least one data record DS(z) is involved in enrichment 431. It is not necessary to completely process a data record (i.e., to take into account all N elements). Elements occurring as features M or classes K are indicated by outlines in bold. Arrows pointing from M to K indicate that classes K are derived from features M.

Although the discussion is limited to individual elements, multiple elements may also occur as feature M and class K. The column indices of M and K within a data record do not have any significance. Thus, the arrows may point to the left or right.

After enrichment, feature M may be removed from the data record; class K may be inserted or feature M may be overwritten.

FIG. 7 shows an example of enrichment 431 in the LOCAL instance in which the elements remain within the same data record DS(z). In other words, only feature M determines class K. Other data records do not affect K.

FIG. 8 shows an example of enrichment 431 in the GLOBAL instance in which the features M(z) and M($\mu$) of at least two data records DS(z) and DS($\mu$), respectively, are used.

The class K may (but need not necessarily) be stored as an element of one of the data records (e.g., DS($\mu$)). The data records DS(z) and DS($\mu$) may be adjacent ($\mu$=z+1, z−1) but need not be adjacent.

It is possible to enrich all of the data records DS(1) . . . DS(Z) of a matrix X. This case is described with the term GLOBAL ALL.

FIGS. 9–10 are used to provide a supplementary illustration of the processing mode of enrichment 431 on the basis of examples. The indices of order are irrelevant here and are not given. The number Z of the data records (DS) in the matrix does not change. Enriching 431 takes place according to predetermined rules (see, e.g., FIGS. 20–22). The classes K are derived from the features M according to these rules. Classes K are written either to the same matrix (origin matrix) or to a secondary matrix (enriched matrix X' from origin matrix X and secondary matrix $X^0$).

Enriching 431 does not preclude columns being deleted. Those skilled in the art will be capable of doing so without requiring any more detailed explanation here. If necessary, intermediate results are stored (in a "log table"), e.g., in the case of calculations that are documented for legal reasons.

FIG. 9 shows an example of enrichment 431 in the LOCAL instance in greater detail. Classes are added within each data record. Column 3 indicates motor vehicle licensing districts (B=Berlin, HD=Heidelberg, MA=Mannheim, F=Frankfurt, D=Düsseldorf), while the secondary matrix ($X^0$, bold outline) indicates the respective postal ZIP code regions (two numerals fixed, three numerals open). The rule (e.g., regional ZIP) is predetermined. Since the data records DS are independent of one another, simultaneous processing of multiple data records DS is advantageous here (parallel processing, see also FIG. 16, part D).

FIG. 10 shows an example of enrichment 431 in the GLOBAL instance in greater detail. Matrix X is enriched here, e.g., by adding a secondary matrix ($X^0$, bold outline) that contains the average of the elements E(z,2) in all data records DS(1) through DS(Z) (sum of E(z,2) from z=1 through z=Z, divided by Z). The average forms the elements of the secondary matrix. In other words, the features M of column 2 are classified in class K "average."

It is characteristic of global enrichment 431 that elements of various data records may be taken into account (e.g., all data records DS). Other examples of globally calculated values include calculation of the following elements: the largest element numerically $E_{MAX}(z)$ within a column (e.g., $E_{MAX}(2)=5$), the smallest element numerically $E_{MIN}(Z)$ within a column (e.g., $E_{MIN}(2)=3$), the standard deviation within a column and the median within a column.

It is not necessary to take into account all the elements of a column; it is also possible to take into account only individual selected elements.

Those skilled in the art are able to further define enrichment 431. This is true of global enrichment as well as local enrichment. These statistical calculations may be supplemented by calculations of additional economic characteristic factors. A calculation is not limited to numbers. Letters or other text information may also be processed, as indicated in conjunction with the motor vehicle licensing districts. It is also conceivable to supplement missing values by using predetermined standard values (default technique).

Figure 13:
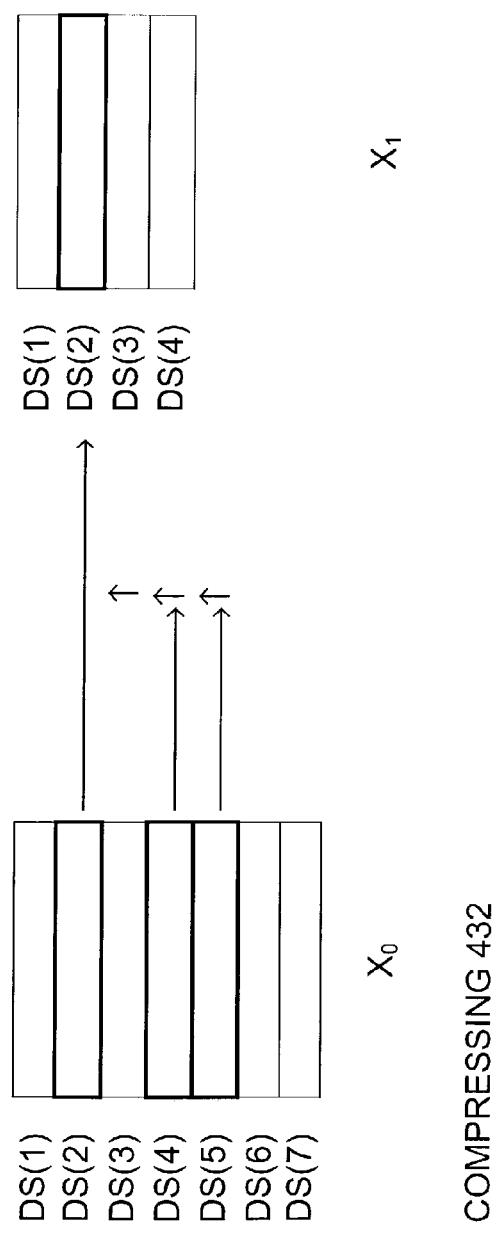
FIG. 13 shows an example of compression in a detailed diagram, applied to multiple data records of the input matrix, which are compressed to form one data record of an intermediate matrix.

FIGS. 11–13 illustrate examples of the processing mode of compression 432. The description uses the term class K for the elements on which compression 432 is based.

FIG. 11 illustrates an example of compression 432. It is advantageous to perform compression 432 only when the matrix has already been sorted. This shows the compression of matrix $X_0$ into matrix $X_1$. The number Z of data records DS is reduced (i.e., $Z_1 < Z_0$).

In this example, data records DS($z_0$) and DS($\mu_0$) in $X_0$ are combined to form data record DS($z_1$) in $X_1$. Compression 432 is also performed according to predetermined rules, which are explained below as an example.

FIG. 12 shows details for an exemplary rule for compression 432. The two columns R and S of matrix $X_0$ will be considered here.

First the elements are read (READ). A query determines whether the elements E(z,R) and E($\mu$,R) meet a predetermined condition. If this is the case, then column R in $X_1$ is changed to E($z_1$,R), for example, and the elements in column S of $X_0$ are linked to an element of column S of $X_1$ (symbol $\oplus$) $E(z_1,S)=E(z_0,S) \oplus +E(\mu_0, S)$.

The linkage is accomplished, for example, through

| | |
|---|---|
| Addition | $E(z_1,S) = E(z_0,S) + E(\mu_0,S)$ |
| Subtraction | $E(z_1,S) = E(z_0,S) - E(\mu_0,S)$ |
| Minimum | $E(z_1,S) = \text{MIN}\,[E(z_0,S), E(\mu_0,S)]$ |
| Maximum | $E(z_1,S) = \text{MAX}\,[E(z_0,S), E(\mu_0,S)]$ |
| Average | $E(z_1,S) = 0.5 * [E(z_0,S), E(\mu_0,S)]$ |

If the condition is not met, compression is not performed and the data records of $X_0$ remain unchanged.

For example, the rule "average—federal state" is as follows:

Combining data records $DS(z_0)$ and $DS(\mu_0)$ to form $DS(z_1)$ when $E(z_0,R)$ and $E(\mu_0,R)$ denote communities in the same federal state. $E(z_0,R)$=Mannheim and $E(\mu_0,R)$=Heidelberg are located in Baden-Württemberg, for example, and $E(z_1,R)$ is set for the abbreviation "BW."This thus forms an element (e.g., "BW") which redefines the data record $DS(z_1)$.

Forming the arithmetic mean for the elements $E(z_0,R)$ and $E(\mu_0,R)$ of the column S and writing it to $E(z_1,s)$.

The rule is simplified approximately for the purpose of illustration. The deciding factor, however, is not the complexity but rather the previous definition of the rule.

Although the rules have been explained in general only with regard to the two columns R and S and with regard to the two data records, those skilled in the art can expand the rule. Suggestions for this are given in FIGS. 20–22.

FIG. 13 shows an example of compression 432 applied to multiple data records (DS(2), DS(4) and DS(5)) of the input matrix $X_0$, compressed to form one data record (DS(2)) of an intermediate matrix $X_1$ ($Z_0$>$Z_1$).

Compression 432 does not preclude columns being deleted and/or compression being performed not only with regard to the rows (DS) but also with regard to the columns. If necessary, intermediate results are stored. Those skilled in the art will be able to do so without requiring a more detailed explanation here.

FIG. 14 shows an exemplary scheme 200 with entries for:
210 order h of the matrices (e.g., 0, 1, 2, and 3) before execution of the steps,
220 LOCAL/GLOBAL instance (for enrichment 431),
230 the type of processing steps (e.g., enrichment 431, compression 432 and input and output of the data),
240 concretization of the rules (e.g., indicating the rules for individual steps, see FIGS. 20–22),
250 parameters (e.g., indicating matrices or columns with which the processing steps are to be executed; identification of M and K).

Figure 17:
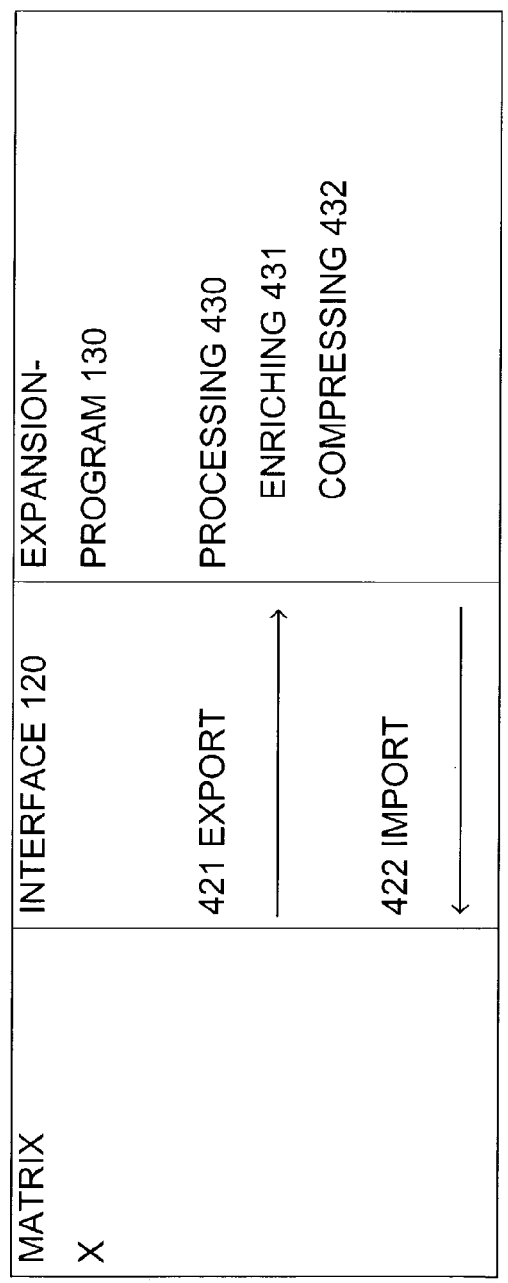
FIG. 17 shows an example of using of an expansion program that communicates with the matrix via an interface and executes the enrichment and/or compression.

The entries 210–250 are represented technically, e.g., by program paths, numerical values, variables or the identifications of interfaces (see, e.g., FIG. 17).

Scheme 200 may be executed in the sequence of running numbers 1 . . . 9 given at the left. For illustration, drawings are referenced at the right to demonstrate corresponding steps. The order is increased with each execution of the compression step.

Scheme 200 may be interpreted—i.e., processed sequentially (cf. 450)—by a processor control program (e.g., CPP 100). The control program causes the execution of steps 430, 440 (in runtime) as indicated in the scheme. Scheme 200 is modifiable independently of the control program 100 of processor 910.

Scheme 200 shown here represents the sequence in general. Individual steps (e.g., compression 432) can be specified in individual subschemes. The subschemes can be specialized, e.g., in schemes for enrichment 431, for compression 432, for predetermined processing algorithms, etc.

"Readout" in the last row 9 of the scheme stands symbolically for writing the matrix to a database for permanent storage of the data.

It is advantageous to prepare in advance certain schemes, which are configured by the user (e.g., a financial institution). The possibility of creating the scheme 200 and the control program (CPP 100) separately is advantageous. This contributes to the confidentiality of the user's operating sequences, as mentioned in the beginning.

FIG. 15 shows an exemplary computer program 100 (with interpreter 150), scheme 200, rules 300 and matrices X. It is advantageous to provide these components on one computer, (e.g., computer 900).

Computer program product 100 (CPP) includes the program code means for controlling the processor 910 (see FIG. 1), which executes processes 401 and 402. A distinction is made between CPP 101 and CPP 102 for processes 401 and 402, respectively. Those skilled in the art will be able to create the program code for each process step. CPP 100 contains the interpreter 150 for sequential processing of scheme 200 (see FIG. 16). Rules 300 are implemented as a collection of rules ("rule repository"), for example.

Figure 18:
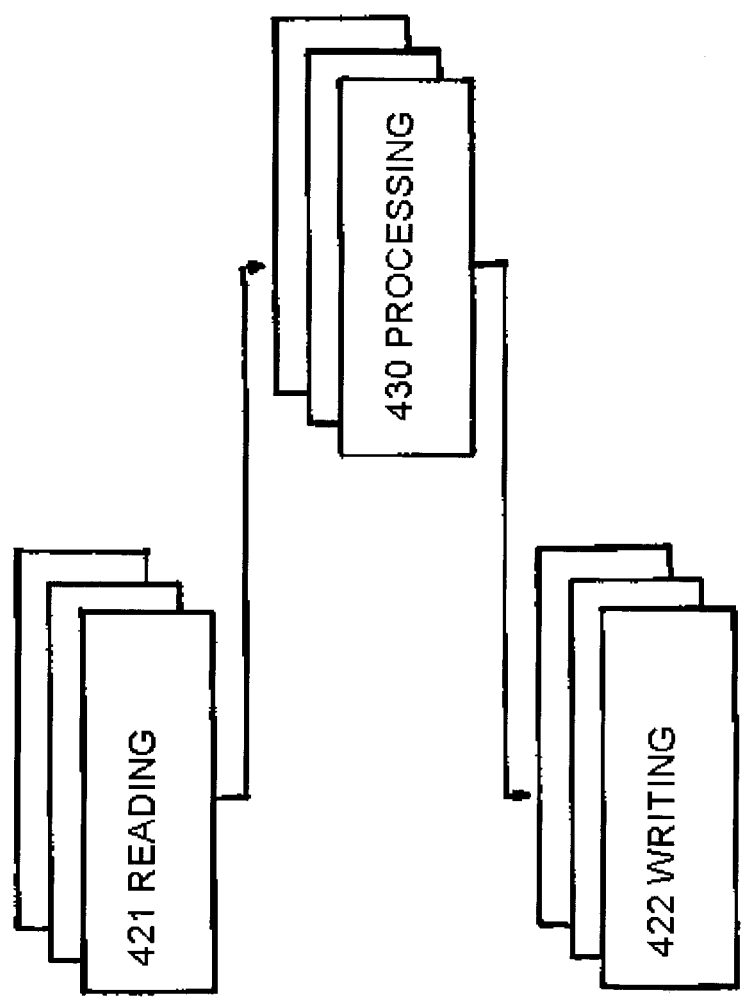
FIG. 18 shows an exemplary flow chart for the steps of reading and processing (enrichment/compression), applied to data records using the expansion program.

Dotted lines indicate advantageous expansions of the CPP 100 (interfaces 120, program 130), which are explained in greater detail in conjunction with FIGS. 17–18.

FIG. 16 shows an exemplary sequence of processing steps for enrichment 431 and how such a sequence of steps can be established on the basis of a sample matrix with three data records. The elements stand for features M, which form the basis for enrichment 431. The numbers in circles denote the processing sequence.

Enrichment 431 of a data record takes place within an interval of time T. Each interval T is determined by the actual execution and by reading and writing operations of memory 920 to processor 910. It is assumed here that access is always to complete data records (reading and writing). In the case of external processing 430, i.e., use of interface 120, for example, and the expansion program 130 of FIGS. 17–18, the number of read and write operations to be executed should to be optimized with regard to speed.

Enrichment 431 takes place in blocks. Parts A, B and C illustrate serial enrichment. Part D shows parallel enrichment.

Part A shows row-by-row enrichment 431 for the following sequence as an example: local enrichment, reading data records DS(1), enriching the feature M from column 1 to class K in column 2, explaining K in column 2 to M, enriching M from column 2 to K in column 3, rewriting the data record DS(1), processing the data record DS(2), and processing the data record DS(3). The final results depend on the interim results.

Part B shows column-by-column enrichment with multiple reading and writing of the data records, often used for global enrichment, e.g., by forming the average over all the data records.

Part C shows a combination of enrichment column-by-column and row-by-row. The results of column 1 can be taken into account in the interim, even if the processing of columns 2 and 3 is still ongoing.

Part D shows the possible parallel with local enrichment (cf. Part A). For example, the following processing takes place: reading data records DS(1), DS(2) and DS(3) simultaneously (but independently of one another), enriching the features M from column 1 to classes K in column 2, explaining the classes K in column 2 to the features M, enriching M from column 2 to K in column 3, rewriting data records DS(1), DS(2) and DS(3) simultaneously.

Those skilled in the art are able to select the option that is the most time saving and to thereby optimize the processing 430 of the entire matrix. Those skilled in the art are familiar with implementation by loop operations, for example. Scheme 200 may be adapted to the needs of the user. For example, automatic selection of the sequence by sorting the entries in scheme 200 is advantageous.

FIG. 17 shows an example of using an expansion program 130 ("user exit"), which communicates with matrix X via an interface 120 and executes the enrichment 431. Compression 432 is also possible.

A matrix ($X_0$ through $X_H$), an expansion program 130 (e.g., for enrichment 431 and compression 432) and an interface 120 by which the expansion program 130 accesses matrix X, are shown. Interface 120 may be defined by using XML ("extensible markup language"). Interface 120 and program 130 are optionally also used to calculate the characteristic function Y (not shown, because similar to 430).

In other words, data records DS are read 421 by the interface 120, processed 430 by the expansion program 130 and written 422 back to the matrix by the interface 120.

It is advantageous to leave the implementation of program 130 completely or partially up to the user.

FIG. 18 shows an exemplary flow chart for the operations of reading 421, processing 430 (i.e., enrichment 431, compression 432) and writing 422 when using the expansion program 130 of FIG. 17.

Reading 421 and writing 422 are optional steps in processes 401 and 402. Steps 421/422 are advantageously applied to complete data records in a manner that saves on resources.

In the case of local enrichment, it is possible to essentially read 421 and/or write 422 multiple data records simultaneously (multiple blocks FIG. 18, cf. also FIG. 16).

Figure 19:
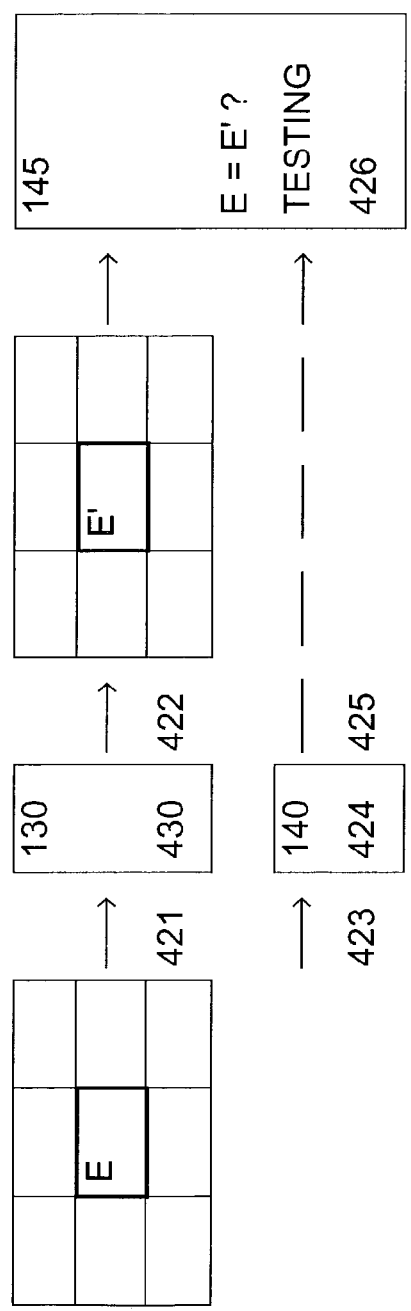
FIG. 19 shows optional testing of a matrix element for change(s) due to the expansion program.

FIG. 19 shows an optional testing 426 of a matrix element E for a change in the expansion program 130. This shows a matrix having an element E (before processing 430), reading 421 in expansion program 130 (see FIGS. 17–18), processing 430 by program 130, writing 422 to the matrix as element E', reading 423 to a buffer memory 140 (before processing 430), temporary storage 424 (during processing 430), writing 425 to a tester 145, and testing 426 for the identity of elements E and E'. Testing 426 is especially advantageous when the expansion program 130 is implemented by the user.

Identity is to be understood in the broadest sense, i.e., including testing 426 for data consistency according to predetermined criteria. Testing 426 may be expanded to multiple elements. Testing 426 is especially advantageous if matrix $X_1$ is modified during processing 430.

FIGS. 20–22 place the emphasis on features M, classes K and rules. Explanations of the rules are based on enrichment 431, but those skilled in the art may also use them for compression 432 (see the rule "average—federal state" of FIG. 12) without requiring further explanation here. As mentioned above, features M and classes K may be, for example, numbers, text, keywords, database pointers ("pointers"), main memory pointers and tables.

FIG. 20 shows an exemplary table with features M and classes K as an example, each in instance 301/303 and group 302/304. There are instances 301/303 in the elements E(z,n) of the matrices. Different instances are separated by a semicolon. Groups 302/304 pertain to commonalities within columns. Column headings are advantageous; groups 302/304 need not necessarily be given or stand in the matrix, however.

The numerical examples are based on FIG. 10. The features M (elements of column 3) stand there as natural numbers (group 302) in the possible instances 301 "3," "4" and "5." The classes K derived therefrom (elements of X°, average here) stand there as real numbers (group 304) in the sample instance "4.0."

Other examples are based on FIG. 9. The cities of Mannheim and Heidelberg both belong to the group of communities; in enrichment 431 to the postal ZIP code class (group 304), its instances 303 are different; in enrichment 431 to the federal state class (group 304) its instances 303 are the same (Baden-Württemberg). The use of different rules for the same features is important for business applications in particular.

It is theoretically conceivable to define a suitable instance 303 of class K for each instance 301 of a feature M for enrichment 431. More practical, however, are rules which are based on groups (to be explained below).

FIG. 21 shows an exemplary table for rules 300. A rule is determined for the combination of a group 302 of features M with a group 304 of classes K. Such combinations include, for example, number/average; community/ZIP; community/state; district/region, etc. The combinations are also advantageously given in scheme 200 (see, e.g., FIG. 14) and are identified unambiguously through groups 302/304.

Those skilled in the art will be capable of implementing the rules. When using the expansion program 130 (see, e.g., FIGS. 17–18), rules are deposited in external databases, for example (repository, e.g., index of ZIP codes).

The rules may be divided into rules predefined by the manufacturer of the software (e.g., number—average) and rules defined by the user (e.g., product—weather). The preferred instances global (G) and local (L) are shown in the right column.

FIG. 22 shows an example of enrichment in several steps (-1,-2), using a chain rule 305. Given for local enrichment 431 from community to ZIP code region as an example, two different rules are used in succession. First, feature M of the group 302 "community" (E(z,a)) is enriched 431 to the class K (E(z,b)) of group 304 by using the rule "community—ZIP." Then K is enriched to M (E(z,b)); feature M of the group 302 "ZIP" is enriched 431-2 with the rule "ZIP—region" to the class of the group 304 (e.g., "Heidelberg" to "69xxx" to "6," E(z,a)).

Additional features and aspects may be incorporated into embodiments of the invention. The features and aspects described below are optional. They may be implemented if needed, but they are not necessary. To simplify the description, terms such as "for example," "optionally," etc. and modal verbs (e.g., "may") are largely avoided.

Calculation 440 of characteristic function Y takes place in the processing mode of enrichment 432. Classes K determined by enrichment 431 form the basis for the characteristic function Y.

In enrichment 431, data records DS are supplemented by explicitly writing classifications, which are implicitly present in the data record (as classifiable features M), into the data records (as classes K). Enrichment 431 leads from feature M to class K.

Enrichment 431 has been explained for cases in which a feature M leads to a class K. The rules may be expanded for multiple features M to one class K (see FIG. 10). The rules 300 may each be applied to at least one first data record DS(z) and one second data record DS($\mu$), whereby features M(z) and M(µ) from both data records determine a class K (see FIG. 8, global enrichment).

Examples of the use of multiple features that can be mentioned here include: correlation, medium, standard deviation, distributions (e.g., gamma), currency conversions, probabilities (binomial, Poisson).

Class K is accepted into at least one of the two data records (cf. FIG. 8, namely DS(µ) there).

In the case of different features, a dominant class that corresponds to one of the two features is selected. For example, data record DS(z) has a feature M "textile" (of group 302 "branch"), and data record DS(µ) has a different feature M "metal" (of the same group 302 "branch"). The rule to be applied stipulates "metal" as dominant class K.

As an alternative, in the case of different features, a class that is at a higher level than one of the two features is selected. For example, data record DS(z) has a feature M "textile" (of group 302 "branch"), and data record DS(µ) has a different feature M "metal" (of the same group 302 "branch"). The rule to be applied stipulates "industry" as a higher-level class K.

In enrichment according to "GLOBAL ALL," the rules 300 are each applied to all data records, so that features from all data records determine a class K (see FIG. 10).

The process step of processing 430 is executed repeatedly (see line 435 in FIG. 3) in such a way that the process step of calculating 440 the characteristic function is performed on matrix X, which was processed last by compression 432. Calculating 440 is thus performed once. Processing 430 (as compression 432) is performed up to a predetermined number H of executions (see FIG. 6, H=2).

The execution of the process step of processing 440 takes place in combination with the processing modes of enrichment 431 and compression 432. In other words, when compression is performed, enrichment is also performed at the same time.

Features M themselves may be adequately classified (e.g., federal states) so that compression 432 can be performed without enrichment 431. In other words, before compression 432 there is a virtual enrichment 431 (without data modification) in which features M are taken over as classes K with no change. The metaphor of virtuality is helpful for an understanding here.

In compression 432, rules 300 are used as in enrichment 431 and/or existing rules are used in a modified form. New rules may also be designed specifically for compression 432.

Correlative instances 301/302 of features M and classes K are taken into account in enrichment 431 and compression 432. With reference to FIG. 20, the features M "sunshades" and "umbrellas" (instance 301) are taken into account. Enrichment 431 with the rule "product—weather" leads to a classification in the abstracted classes K (categories, instance 303) "nice weather" and "bad weather." These classes are stored in data records DS(z) and DS(µ), respectively. With respect to the profits of various manufacturers of sunshades, these are conflicting classes. In compression 432 (rule weather—profit), the conflicting nature of these classes is taken into account. The total profit of the two is not the sum (absolute value) of the two possible profits but instead is a sum with the correct plus or minus sign. In nice weather, the manufacturer of sunshades has a profit advantage at the expense of the manufacturer of umbrellas. The situation is exactly the opposite in bad weather. Profits from umbrellas are at the detriment of sunshades. In other words, a data correlation can be taken into account.

Processing 430 and calculating 440 are performed on matrices that are implemented in the main memory or in a database.

Before processing 450 (interpreting) of scheme 200, there is a check for sequences of processing steps of the type enrichment 432, in which enrichment takes place within the data records, so that the processing steps are executed in parallel (cf. FIG. 16, part D).

After the step of processing 430, the respective data record is flagged, in the simplest case by setting one bit. However, it is also possible to apply a time stamp. Flagging allows a new calculation of the characteristic function Y when there is a subsequent modification of matrix $X_0$, taking into account the revised data records without completely repeating the calculations for the entire matrix. The CHANGING function is solved.

Calculating 440 includes not only most of the data records but all data records (i.e., DS(1) through $DS(Z_H)$).

Compression 432 of data records is performed from a first matrix and from a second matrix. The two matrices have the same order h because compression 432 of the same number has been performed on them.

Processes 401 and 402 are executed by a computer 900, which manages both the control program (CPP 100) as well as the matrices in the main memory. The main memory is a 2.5 gigabyte RAM memory, for example. Processor 910, memory 920 and the bus work with the usual 64-bit addressing.

Computer system 999 (see FIG. 1) is used to execute processes 401/402. Program medium 970 has a computer-readable medium on which are stored computer-readable program code means, which are used for executing processes 401/402 in the embodiments indicated.

Computer program product (CPP) 101/102 has program instructions that cause a processor 910 (see FIG. 1) to execute the process steps of processes 401/402.

Embodiments of the present invention may involve the processing of financial data, e.g., for calculating the risk of failure (e.g., address risk, contract risk, imminent risk) and asset-liability control ("asset-liability management"). It is also possible to implement financial standard calculations (e.g., derivation, calculation of exposure, conditioning).

The goal of calculation in the application of address risk is to identify risks. The characteristic function Y then corresponds to the probability of a risk event (see FIG. 5). Credit risks are calculated quickly and with sufficient accuracy, flexibly and internally within the bank while saving on resources (see the functions TIME, RESOURCES, INTERFACES, SEQUENCE). The user (e.g., a bank or insurance company) may define its own rules and may implement them in expansion program 130.

Matrix $X_0$ is supplied from the following data, for example: business partner data (i.e., data regarding bank customers) and contractual data (i.e., details of contracts between bank and customer). Each data record is the technical representation of the features of an address risk carrier (e.g., a business partner). For example, for partners in data record DS(1) with the following elements: E(1,1): customer "ALPHA" (name), E(1,2): "credit agreement" (type of agreement), E(1,3): "1000 euro" (amount), E(1,4): "payment by Dec. 31, 2002" (expiration date), "in the city HD" (location), "residual debt insurance concluded" (insurance). Groups 302/304 are given in parentheses (cf. FIG. 19).

Processing 430 and especially calculating 440 depend on a portfolio model, which is defined by the user and enters into scheme 200.

In other words, processes 401 and 402 are used in the financial area. Such a scheme is used, describing the characteristic function Y as a probability $Y_B$ of a financial loss $Y_A$ of a defined magnitude.

In general, this involves the application of processes 401 and 402 in business applications, where the features and classes include those belonging to the following group: solvency, branch, federal state, profit, company, community, form of business (AG, GmbH, KG, etc.), capital, cost, type of credit, district, product, postal code (ZIP), region, risk, loss, etc.

This application is related to and claims the benefit of priority under 35 U.S.C. 119(a) to European Patent Application No. 01130883.0, filed on Dec. 27, 2001, the disclosure of which is expressly incorporated herein by reference to its entirety.

| List of Reference Notations | |
| --- | --- |
| −1, −2 | Notation for repetitions |
| 100 | Computer program product (CPP) |
| 101 | CPP for method 401 |
| 102 | CPP for method 402 |
| 120 | Interface |
| 130 | Expansion program |
| 140 | Buffer memory |
| 145 | Tester |
| 150 | Interpreter |
| 200 | Scheme |
| 210–240 | Entries in scheme |
| 300 | Rules |
| 301, 303 | Instance of M and K |
| 302, 304 | Group of M and K |
| 305 | Chain rule |
| 401 | First process |
| 402 | Second process |
| 421, 423 | Reading |
| 422, 425 | Writing |
| 424 | Temporary storage |
| 426 | Testing |
| 430 | Processing |
| 430, 440, 450 | Processes steps |
| 431 | Enriching |
| 432 | Compressing |
| 435 | Repeating |
| 440 | Calculating |
| 450 | Interpreting |
| 900, 901, 902 | Computer |
| 910 | Processor |
| 920 | Memory |
| 930 | Bus |
| 940 | Input device |
| 950 | Output device |
| 960 | User interface |
| 970 | Program medium |
| 980, 981, 982 | Signal |
| 990 | Network |
| 999 | Computer system |
| DS | Data record |
| E | Element of a matrix |
| H | Order of the last intermediate matrix |
| K | Class |
| M | Feature |
| N | Number of elements in DS |
| n, a, b, c | Column index |
| R | Column index (in compression) |
| S | Column index (in compression) |
| X | Matrix, general |
| X' | Enriched matrix |
| X° | Secondary matrix |
| $X_0$ | Input matrix (original data) |
| $X_1, X_2, X_H$ | Temporary matrix |
| Y | Characteristic function |
| $Y_A, Y_B, Y_B MAX$ | Numerical values of the characteristic function |
| $Y_A^*$ | Characteristic number |
| z, μ | Row index |
| $Z, Z_0, Z_1$ | Number of data records (rows) |

What is claimed:

1. A method of data processing with a program-controlled processor for determining a characteristic function from a matrix with a defined number of data records having classifiable features, wherein the method comprises processing the matrix, and calculating the characteristic function based on the processed matrix, and wherein processing includes enriching the matrix with classes for the features while retaining the number of data records and compressing according to the classes with a reduction in the number of data records, and further wherein the method additionally comprises interpreting a predetermined scheme in which a sequence of the individual executions for enrichment and compression, and rules for the particular individual executions are defined.

2. The method according to claim 1, whereby calculating the characteristic function takes place in the enrichment of the matrix.

3. The method according to claim 1, whereby calculating the characteristic function is performed with the assistance of another matrix that is linked to the matrix thus processed.

4. The method according to claim 1, whereby in enrichment the classes are derived from the features according to predetermined rules.

5. The method according to claim 4, whereby the rules provide for expansion by predetermined standard values.

6. The method according to claim 4, whereby the rules are applied to at least one data record so that the feature and the class remain in the at least one data record.

7. The method according to claim 6, whereby the class overwrites the feature.

8. The method according to claim 4, whereby the rules are each applied to a first data record (DS(z)) and a second data record (DS(μ)), the features (M(z), M(μ)) from both data records determining one class.

9. The method according to claim 8, whereby the class is transferred to at least one of the two data records (DS(z), DS(μ)).

10. The method according to claim 9, whereby in the case of different features (M(z), M(μ)), a dominant class that corresponds to one of the two features is selected.

11. The method according to claim 9, whereby in the case of different features, a class that is at a higher level than both features (M(z), M(μ)) is selected.

12. The method according to claim 4, whereby the rules are applied to all the data records, so that features ((M(1) . . . M(Z)) from all the data records (DS(1) . . . DS(Z)) determine one class.

13. The method according to claim 4, whereby in enrichment one rule is used for the combination of a feature group with a class group.

14. The method according to claim 4, whereby a chain rule is used.

15. The method according to claim 1, wherein processing comprises executing individual executions for enrichment so that elements of a data record remain within the same data record.

16. The method according to claim 1, wherein processing is executed repeatedly.

17. The method according to claim 16, whereby calculating the characteristic function is executed with the matrix processed last by compression.

18. The method according to claim 16, wherein compressing comprises performing compression up to a predetermined number of executions.

19. The method according to claim 1, whereby wherein the steps of enrichment and compression are performed simultaneously.

20. The method according to claim 1, whereby enrichment is performed before compression, and the features are transferred unchanged as classes.

21. The method according to claim 1, further comprising applying the rules defined in the predetermined scheme for compression and enrichment.

22. The method according to claim 1, further comprising correlating instances of the features and classes during enrichment and compression.

23. The method according to claim 1, whereby processing and calculating are performed on matrices that are implemented in a main memory.

24. The method according to claim 1, whereby the predetermined scheme is modifiable independently of an interpreter.

25. The method according to claim 1, whereby the processor is controlled by sequential processing of the scheme.

26. The method according to claim 1, whereby the scheme specifies individual steps in subschemes.

27. The method according to claim 26, whereby the subschemes are specialized for enrichment and compression.

28. The method according to claim 1, further comprising performing a test for sequences of processing steps for enrichment before processing the scheme, enrichment of the matrix being performed within the data records so that the processing steps are executed in parallel.

29. The method according to claim 1, wherein processing comprises reading data records with an interface, processing the data records by an expansion program and writing the data records back to the matrix with the interface.

30. The method according to claim 1, whereby an interface, which is defined in XML, is used.

31. The method according to claim 1, further comprising flagging a data record after processing has been performed on the data record.

32. The method according to claim 1, further comprising storing intermediate results.

33. The method according to claim 1, whereby all of the data records are included in the step of calculating.

34. The method according to claim 1, whereby compression of data records takes place from a first matrix and from a second matrix.

35. The method according to claim 1, further comprising performing, after processing, a test for the identity of the matrix elements.

36. The method according to claim 1, whereby features and classes are used as numbers, tests, keywords, database pointers, main memory pointers or tables.

37. A computer system for executing the method according to claim 1, the computer system comprising a main memory and a control program for controlling a processor to perform the steps of processing, calculating and interpreting, whereby the computer manages both the control program and matrices in the main memory.

38. An application of the method according to claim 1, whereby the scheme describes the characteristic function as a probability of a financial loss of a defined order of magnitude.

39. An application of the method according to claim 1 in a business application, whereby the features and classes belong to at least one of the following group: solvency, branch, federal state, profit, company, community, form of business, capital, costs, type of credit, district, product, ZIP code, region, risk, and loss.

40. A computer system for executing the method according to claim 1.

41. A program medium with a computer-readable medium on which computer-readable program code means are stored, which are used to execute the method according to claim 1.

42. A computer program product with program instructions, which cause a processor to execute the method according to claim 1.

43. A computer program product with computer-readable program instructions for a processor, the computer program product for determining a characteristic function from a matrix with a defined number of data records having classifiable features, wherein the computer program product comprises instructions for processing the matrix and instructions for calculating the characteristic function based on the processed matrix, and wherein processing includes enriching the matrix with classes for the features while retaining the number of data records, and compressing according to the classes with a reduction in the number of data records, and further wherein the computer program product additionally comprises instructions for interpreting a predetermined scheme in which a sequence of the individual executions for enrichment and compression, and rules for the particular individual executions are defined.

* * * * *